(12) United States Patent
Wilson et al.

(10) Patent No.: US 8,755,143 B2
(45) Date of Patent: Jun. 17, 2014

(54) DISK DRIVE ADJUSTING ROTATIONAL POSITION OPTIMIZATION (RPO) ALGORITHM TO COMPENSATE FOR REPEATABLE RUNOUT (RRO)

(75) Inventors: Rebekah A. Wilson, Lake Forest, CA (US); Kenny T. Coker, Firestone, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 491 days.

(21) Appl. No.: 13/095,691

(22) Filed: Apr. 27, 2011

(65) Prior Publication Data
US 2012/0275050 A1 Nov. 1, 2012

(51) Int. Cl.
*G11B 5/596* (2006.01)
(52) U.S. Cl.
USPC ........................................................ 360/77.04
(58) Field of Classification Search
None
See application file for complete search history.

(56) References Cited

U.S. PATENT DOCUMENTS

| | | | | |
|---|---|---|---|---|
| 6,937,424 B2 * | 8/2005 | Chang et al. | ............... | 360/77.04 |
| 6,952,322 B1 * | 10/2005 | Codilian et al. | ........... | 360/77.05 |
| 6,968,422 B1 * | 11/2005 | Codilian et al. | .............. | 711/112 |
| 7,145,745 B1 * | 12/2006 | Shepherd et al. | .......... | 360/77.04 |
| 7,333,288 B2 * | 2/2008 | Kim et al. | .................. | 360/77.04 |
| 7,471,486 B1 | 12/2008 | Coker et al. | | |
| 7,746,593 B2 | 6/2010 | Sudo | | |
| 2008/0002280 A1 | 1/2008 | Asakura | | |
| 2010/0073808 A1 | 3/2010 | Eppler et al. | | |

* cited by examiner

*Primary Examiner* — K. Wong

(57) ABSTRACT

A disk drive is disclosed comprising a first disk surface comprising a plurality of tracks, wherein each track comprises a number of data sectors and a number of servo sectors, and a second disk surface comprising a plurality of tracks, wherein each track comprises a number of data sectors and a number of servo sectors. A first repeatable runout (RRO) sinusoid is generated representing an RRO of the first disk surface, and a second RRO sinusoid is generated representing an RRO of the second disk surface. A plurality of access commands are received from a host which are stored in a command queue, and one of the access commands is selected to execute in response to the first and second RRO sinusoids.

16 Claims, 7 Drawing Sheets

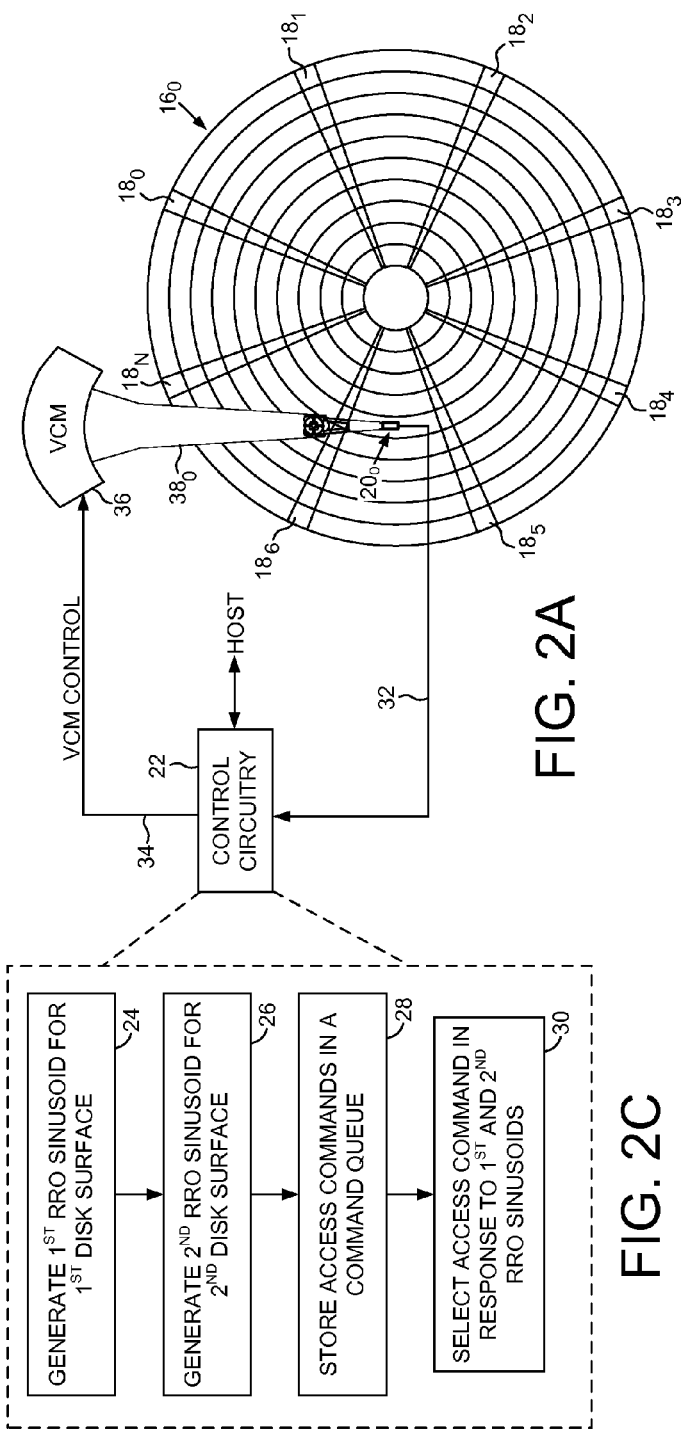
FIG. 2A
FIG. 2C
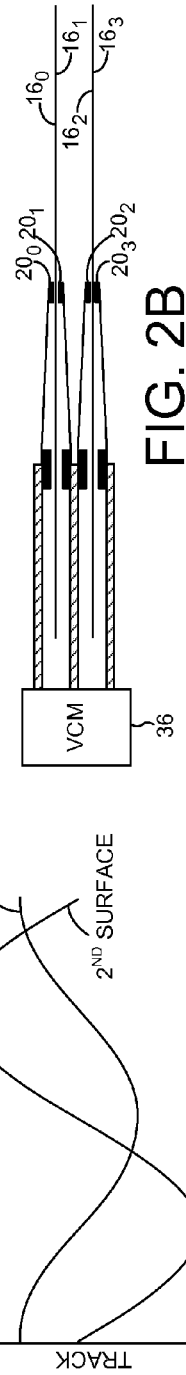
FIG. 2B
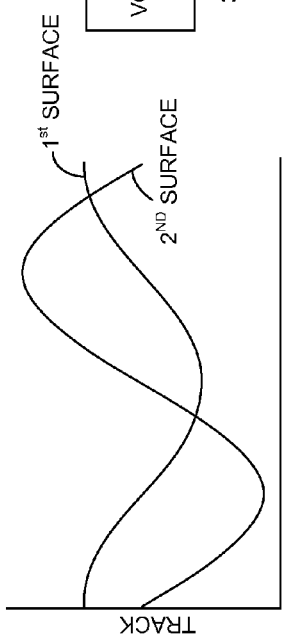
FIG. 2D $d = [a1\cos(2\pi i/N) + b1\sin(2\pi i/N)] - [a2\cos(2\pi i/N) + b2\sin(2\pi i/N)]$ $d = [a1\cos(2\pi j/N) + b1\sin(2\pi j/N)] - [a2\cos(2\pi j/N) + b2\sin(2\pi j/N)]$
$j = f(i, Vr, D)$ $d = [a1\cos(2\pi(i-\Delta_1)/N) + b1\sin(2\pi(i-\Delta_1)/N)] - [a2\cos(2\pi(i-\Delta_2)/N) + b2\sin(2\pi(i-\Delta_2)/N)]$

US 8,755,143 B2

DISK DRIVE ADJUSTING ROTATIONAL POSITION OPTIMIZATION (RPO) ALGORITHM TO COMPENSATE FOR REPEATABLE RUNOUT (RRO)

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3).

The prior art disk format of FIG. 1 also comprises a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

Multiple access commands may be received from the host while the disk drive is executing a current access command. The access commands are typically buffered in a command queue, and when the disk drive is finished executing the current command, a next command is chosen from the command queue according to a rotational position optimization (RPO) algorithm. The RPO algorithm attempts to choose the next command that will minimize the mechanical latency in accessing the disk, including the seek time required to move the head to the target track and the rotation time for the head to reach the target data sector.

BRIEF DESCRIPTION OF THE DRAWINGS

FIG. 2A shows a disk drive according to an embodiment of the present invention comprising a head actuated over a disk surface.

FIG. 2B shows a disk drive according to an embodiment of the present invention comprising a plurality of disk surfaces.

FIG. 2C is a flow diagram according to an embodiment of the present invention wherein an access command is selected from a command queue based on a repeatable runout (RRO) of a first and second disk surface.

FIG. 2D illustrates a RRO of first and second disk surfaces according to an embodiment of the present invention.

FIG. 5A illustrates an embodiment of the present invention wherein a skew exists between the servo sectors of the first and second disk surfaces.

DETAILED DESCRIPTION OF EMBODIMENTS OF THE INVENTION

Figure 1:
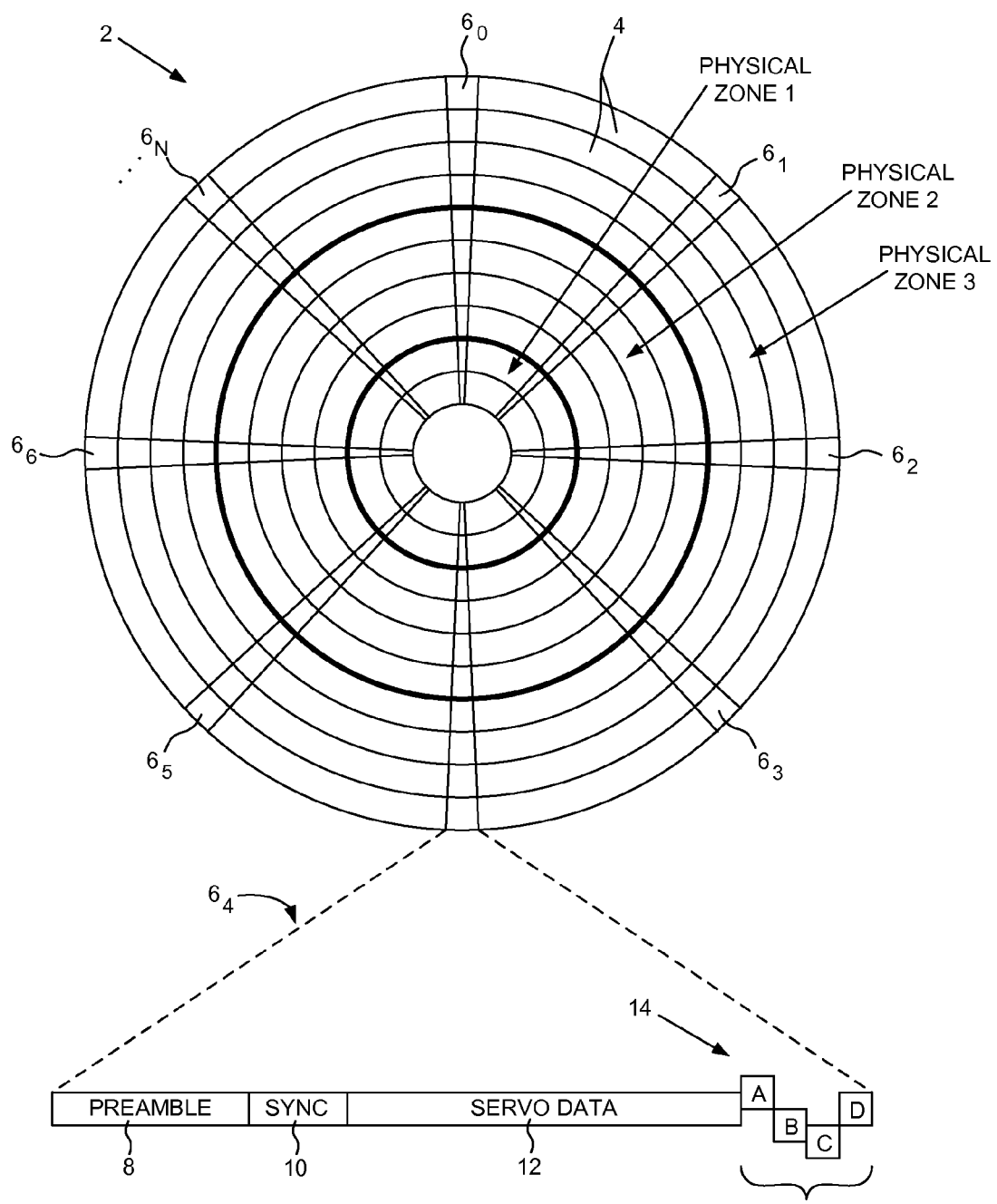
FIG. 1 shows a prior art disk format comprising a plurality of tracks defined by embedded servo sectors.

FIGS. 2A and 2B show a disk drive according to an embodiment of the present invention comprising a first disk surface $16_0$ comprising a plurality of tracks, wherein each track comprises a number of data sectors and a number of servo sectors $18_0$-$18_N$, and a second disk surface $16_1$ comprising a plurality of tracks, wherein each track comprises a number of data sectors and a number of servo sectors $18_0$-$18_N$. The disk drive further comprises a head $20_0$-$20_3$ actuated over each disk surface $16_0$-$16_3$, and control circuitry 22 operable to execute the flow diagram of FIG. 2C. A first repeatable runout (RRO) sinusoid is generated representing an RRO of the first disk surface (step 24), and a second RRO sinusoid is generated representing an RRO of the second disk surface (step 26). A plurality of access commands are received from a host which are stored in a command queue (step 28), and one of the access commands is selected to execute in response to the first and second RRO sinusoids (step 30).

In the embodiment of FIG. 2A, the control circuitry 22 processes a read signal 32 emanating from the head $16_0$ to demodulate the servo sectors $18_0$-$18_N$ and generate a position error signal (PES) representing an error between the detected position of the head and a target position relative to a target track. The control circuitry 22 filters the PES using a suitable compensation filter to generate a control signal 34 applied to a voice coil motor (VCM) 36 which rotates an actuator arm $38_0$ about a pivot in order to actuate the head $16_0$ radially over the disk surface in a direction that reduces the PES. During seek operations wherein the head is moved from a current track to a target track corresponding to a selected access command, the control circuitry 22 processes the position information from the servo sectors $18_0$-$18_N$ to move the head $20_0$ at a target velocity of a velocity profile defined relative to a starting and ending track.

The servo sectors $18_0$-$18_N$ may be written to each disk surface in any suitable manner, such as servo writing the disk surfaces after being installed into each disk drive, or prior to installation (e.g., using a media writer or stamping the disk surfaces). In one embodiment, the servo sectors $18_0$-$18_N$ define non-centric tracks with respect to the center of the spindle motor that rotates the disks. For example, in an embodiment where the disk surfaces are servo written prior to installing the disks into a disk drive, the disks may be clamped to the spindle motor such that the centers of the disks do not align with the center of the spindle motor. This causes a repeatable runout (RRO) of each disk surface with respect to the heads. In addition, the RRO may be different between each disk surface, for example, if the two disks shown in FIG. 2B are clamped to the spindle motor with differing alignments such that the center of each disk is offset by a different magnitude and phase with respect to the center of the spindle motor. This is illustrated in the embodiment of FIG. 2D which shows first and second RRO sinusoids corresponding to respective first and second disk surfaces. The magnitude and phase of each RRO sinusoid corresponds to the magnitude and phase of the non-centric alignment of each disk with the center of the spindle motor.

Figure 3:
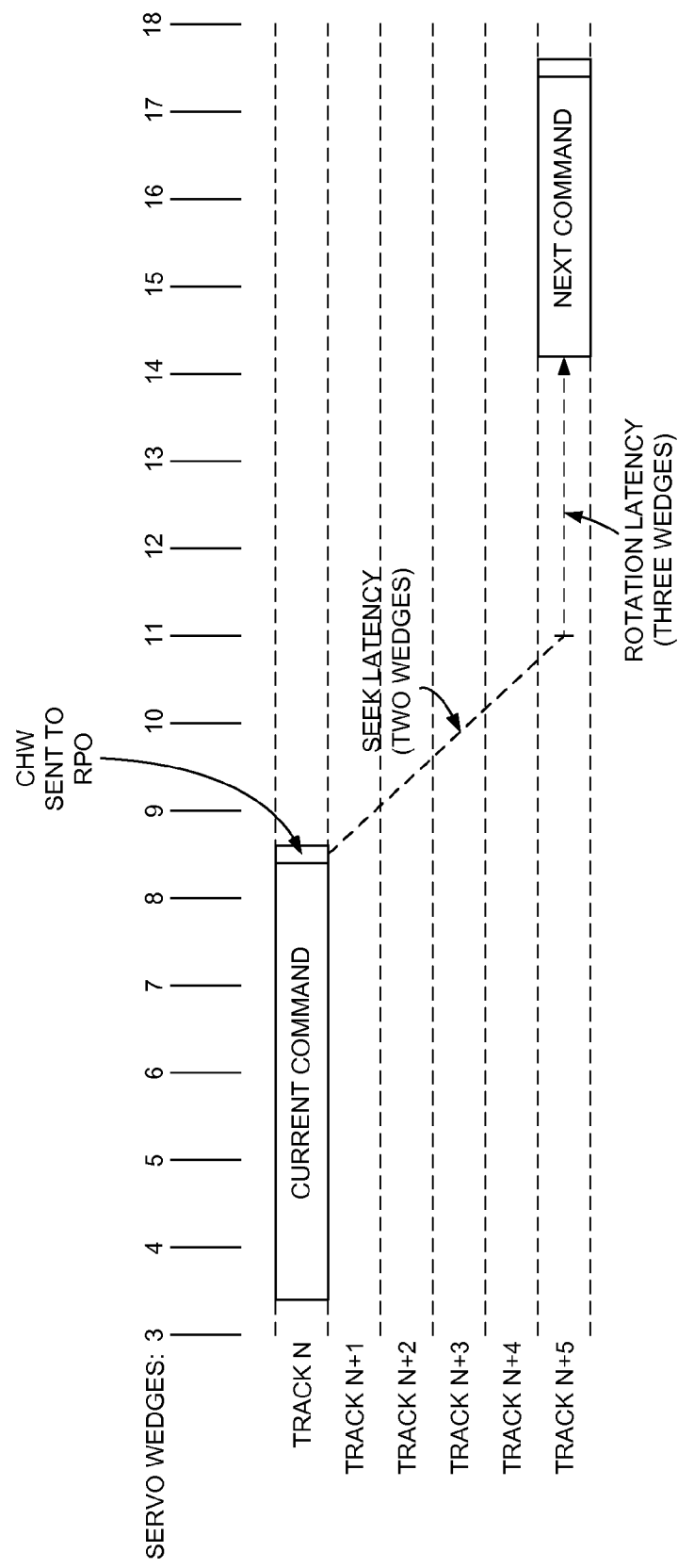
FIG. 3 illustrates an embodiment of the present invention wherein an access command is selected from a command queue that minimizes a seek and rotational latency using a rotational position optimization algorithm (RPO).

In the embodiments of the present invention, the different RRO sinusoids of different disk surfaces impacts the algorithm for selecting the next access command from the command queue to execute. For example, in one embodiment the selection algorithm comprises a rotational position optimization (RPO) algorithm which selects the access command to execute in an order that minimizes the seek and rotational latency (thereby maximizing the throughput of the disk drive). FIG. 3 illustrates an example seek and rotational latency from the end of a current command to a possible next command, wherein the latency is computed in terms of servo wedges (area between consecutive servo sectors). A seek and rotational latency may be computed for each access command in the command queue, and then the access command having the smallest latency selected as the next access command to execute.

In the example of FIG. 3, the current command may be on a first disk surface and the possible next access command may be on a second disk surface (requiring a head switch). If the RRO of the first and second disk surfaces are different as illustrated in FIG. 2D, the estimated seek latency may be incorrect if it is computed with respect to the first disk surface. Accordingly, the embodiments of the present invention take into account the differing RRO between first and second disk surfaces when estimating the seek latency of each access command in the command queue.

The RRO sinusoid representing the RRO of a disk surface may be generated in any suitable manner using any suitable mathematics. In an embodiment shown in FIG. 4A, the RRO sinusoid of a first disk surface is generate according to:

$$a1 \cos(2\pi k/N) + b1 \sin(2\pi k/N);$$

and the RRO sinusoid of a second disk surface is generated according to:

$$a2 \cos(2\pi k/N) + b2 \sin(2\pi k/N);$$

where a1, b1, a2, b2 are coefficients, k represents a servo sector index, and N is the number of servo sectors on each disk surface. The coefficients a1, b1, a2, b2 determine the magnitude and phase of the resulting RRO sinusoids and may be determined in any suitable manner. In one embodiment, the coefficients of the RRO sinusoids are estimated recursively by computing an error signal (e.g., PES in response to the servo sectors during a tracking operation) and then adjusting the coefficients so that the error signal approaches zero. In another embodiment, the RRO sinusoid for each disk surface may be generated from feedforward RRO values generated by a servo system for following the RRO during tracking operations. The feedforward RRO values of the servo system are in units of a VCM control signal, and therefore the feedforward RRO values (e.g., coefficients of a sinusoid) are converted so that the resulting magnitude of the RRO sinusoids shown in FIG. 4A are in units of tracks.

Figure 4A:
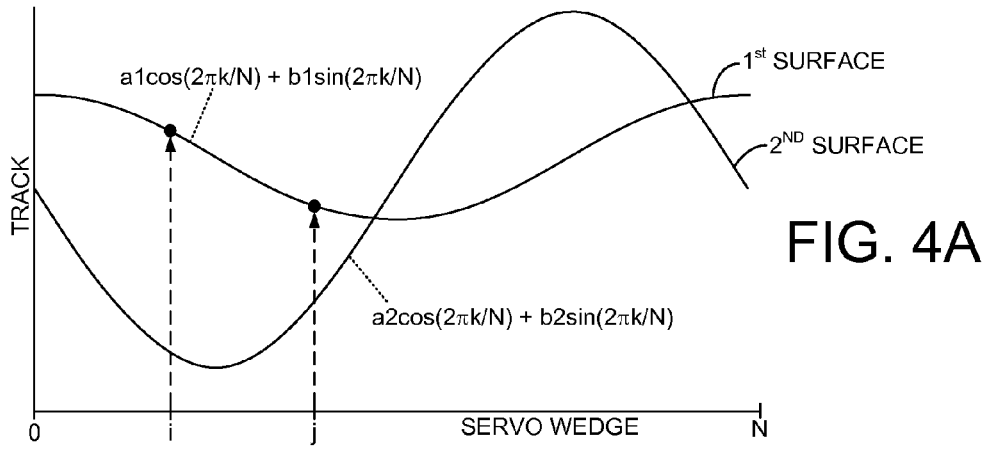
FIG. 4A illustrates equations for generating the RRO sinusoids of first and second disk surfaces according to an embodiment of the present invention.
Figure 4B:
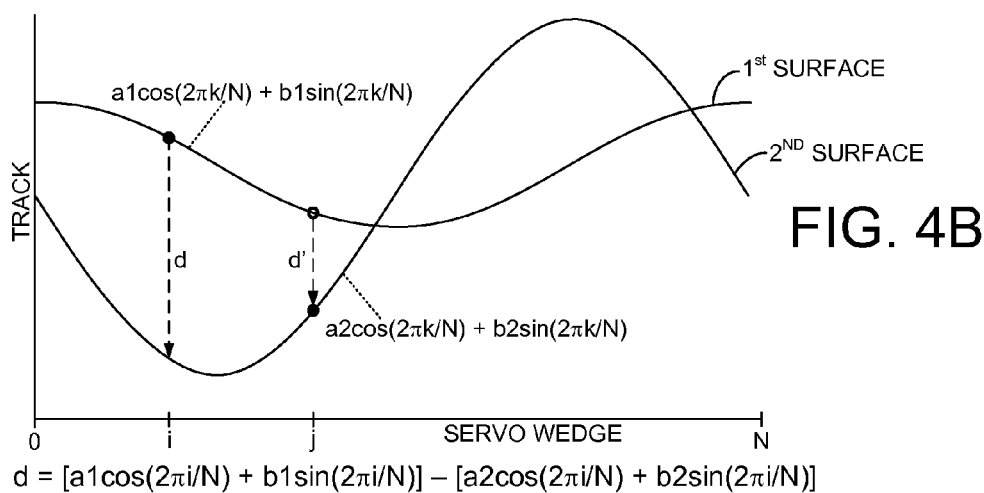
FIG. 4B illustrates an embodiment of the present invention wherein a difference between RRO sinusoids of first and second disk surfaces at the beginning of a seek operation are used to estimate a seek distance when switching between disk surfaces.

FIG. 4A illustrates a seek operation from a starting track at servo sector i to an ending track at servo sector j (e.g., from servo sector 9 to 11 in the example of FIG. 3), where the starting track and the ending track are both on a first disk surface. The RRO of the first disk surface will not affect the estimated seek distance (and estimated seek latency) since the servo system will adjust the velocity of the head to compensate for the RRO (e.g., maintain a constant velocity relative to the disk surface). However, if the ending track is on a second disk surface as illustrated in FIG. 4B, the different RRO of the first and second disk surfaces will affect the estimated seek distance. If the seek operation is performed using the first disk surface, when the head reaches the target track of the first disk surface it will still be a distance d' away from the target track on the second disk surface as illustrated in FIG. 4B. Accordingly, if after seeking across the first disk surface a head switch is executed to switch to the second disk surface, the servo system will still need to move the head a distance d' in order to reach the target track of the second disk surface. In other words, the actual seek distance will be different (longer or shorter) when a seek involves switching disk surfaces.

In one embodiment, the adjusted seek distance due to RRO is estimated assuming the head switch occurs at the beginning of the seek operation. Referring again to FIG. 4B, assuming the head switches from the first disk surface to the second disk surface at the beginning of the seek, the starting track of the first disk surface will be different from the starting track of the second disk surface by d tracks (which may be an integer or an integer plus a fractional number of tracks). That is, the starting track of the second disk surface will be either closer or further away from the ending track of the seek operation by a distance d, and therefore the estimated seek distance is adjusted by distance d. In one embodiment, the distance d is computed as shown in FIG. 4B as the difference between the RRO sinusoids of the first and second disk surfaces at servo sector i:

$$[a1 \cos(2\pi i/N) + b1 \sin(2\pi i/N)] - [a2 \cos(2\pi i/N) + b2 \sin(2\pi i/N)]$$

where i represents the starting servo sector of the seek operation. Once the adjusted seek distance is known, the corresponding seek latency can be estimated and used in the RPO algorithm as described above.

Figure 4C:
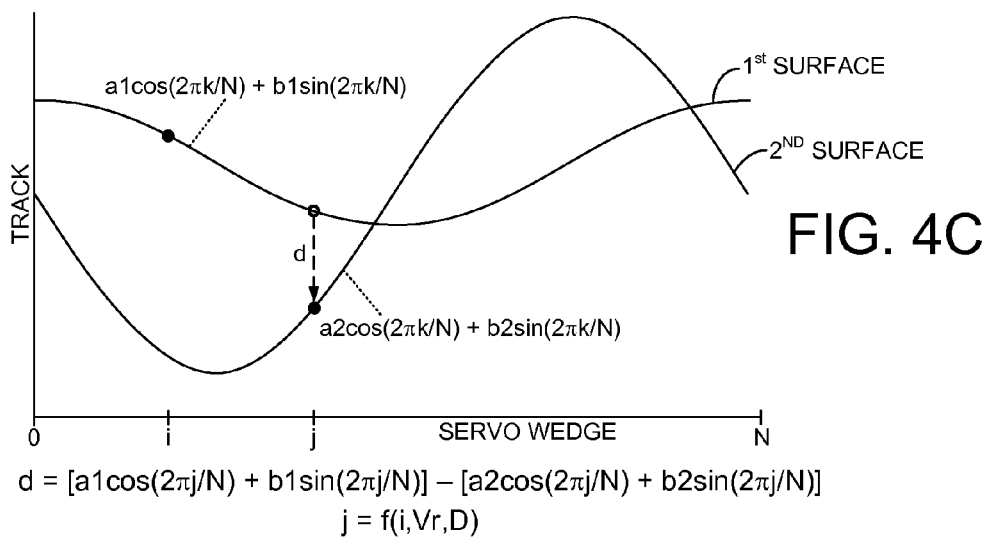
FIG. 4C illustrates an embodiment of the present invention wherein a difference between RRO sinusoids of first and second disk surfaces near the end of a seek operation are used to estimate a seek distance when switching between disk surfaces.

In another embodiment, the adjusted seek distance due to the RRO is estimated assuming the head switch occurs at the end of the seek operation. Referring to FIG. 4C, an ending servo sector j of the seek operation is estimated based on the starting servo sector i, the rotational velocity of the disks Vr, and the initial seek distance D (before being adjusted). The distance d between the ending tracks at the end of the seek operation (using the first disk surface) and the corresponding adjustment d to the seek distance is computed as the difference between the RRO sinusoids of the first and second disk surfaces at servo sector j:

[a1 cos(2πj/N)+b1 sin(2πj/N)]−[a2 cos(2πj/N)+b2 sin(2πj/N)].

In one embodiment, the servo system performs a first seek to seek the head from the starting track to the ending (target) track on the first disk surface, performs a head switch to the second disk surface, and then performs a second seek (by distance d) to position the head over the target track of the second disk surface. In an alternative embodiment, the servo system may adjust the first seek by distance d so at the end of the first seek the head is positioned at (or very near) the target track on the second disk surface after the head switch (thereby obviating the second seek). In either embodiment, the total seek distance can be estimated and converted into an estimated seek latency for the RPO algorithm.

In yet another embodiment, the head switch may be performed in the middle of a seek operation, and the corresponding adjustment d to the estimated seek distance may be computed relative to the servo sector where the head switch occurs. In other words, the adjustment d to the estimated seek length may be computed at any servo sector along the length of the seek operation. In one embodiment, the estimated seek distance may be computed for a number of different servo sectors (e.g., beginning and ending servo sectors) and the head switched performed relative to the servo sector that results in the shortest seek distance.

Figure 4D:
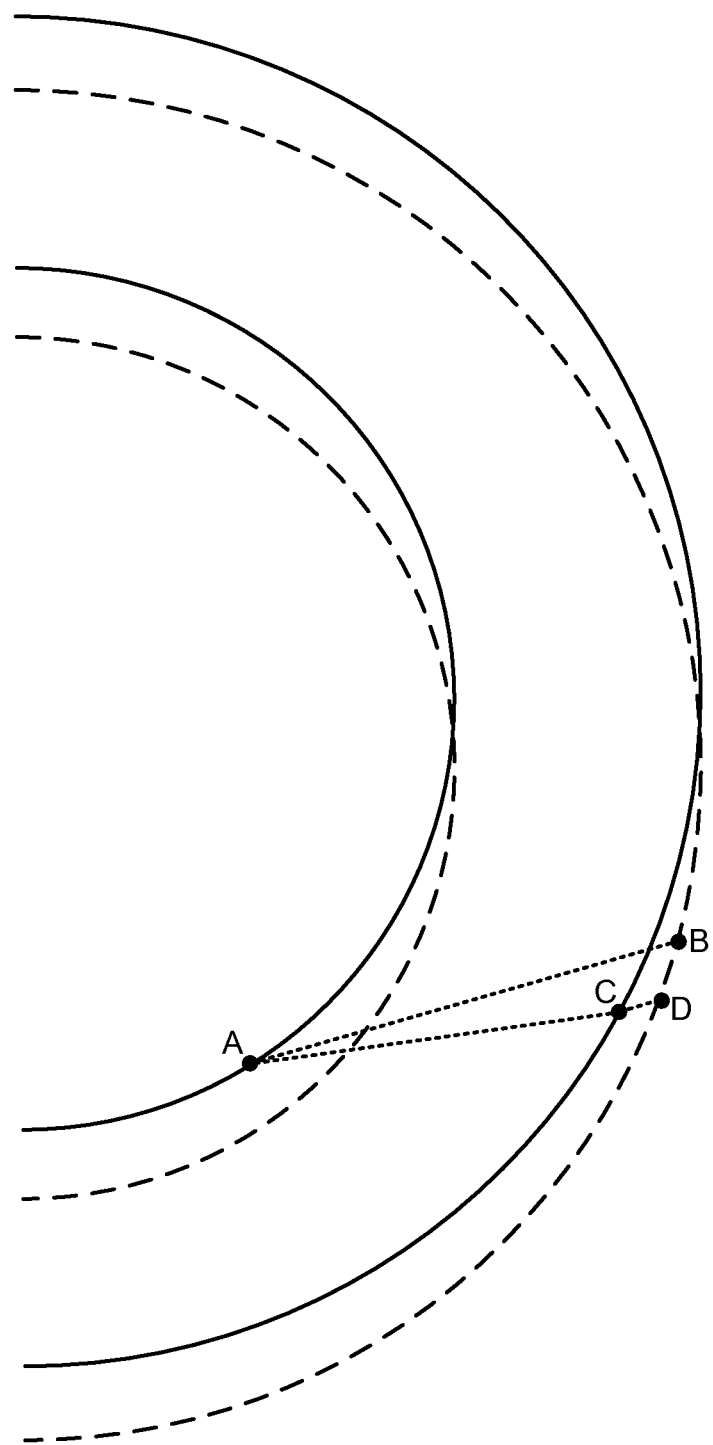
FIGS. 4D and 4E illustrate an embodiment of the present invention wherein the seek latency may be affected by when the head switch operation is performed (e.g., at the beginning or end of the seek operation).
Figure 4E:
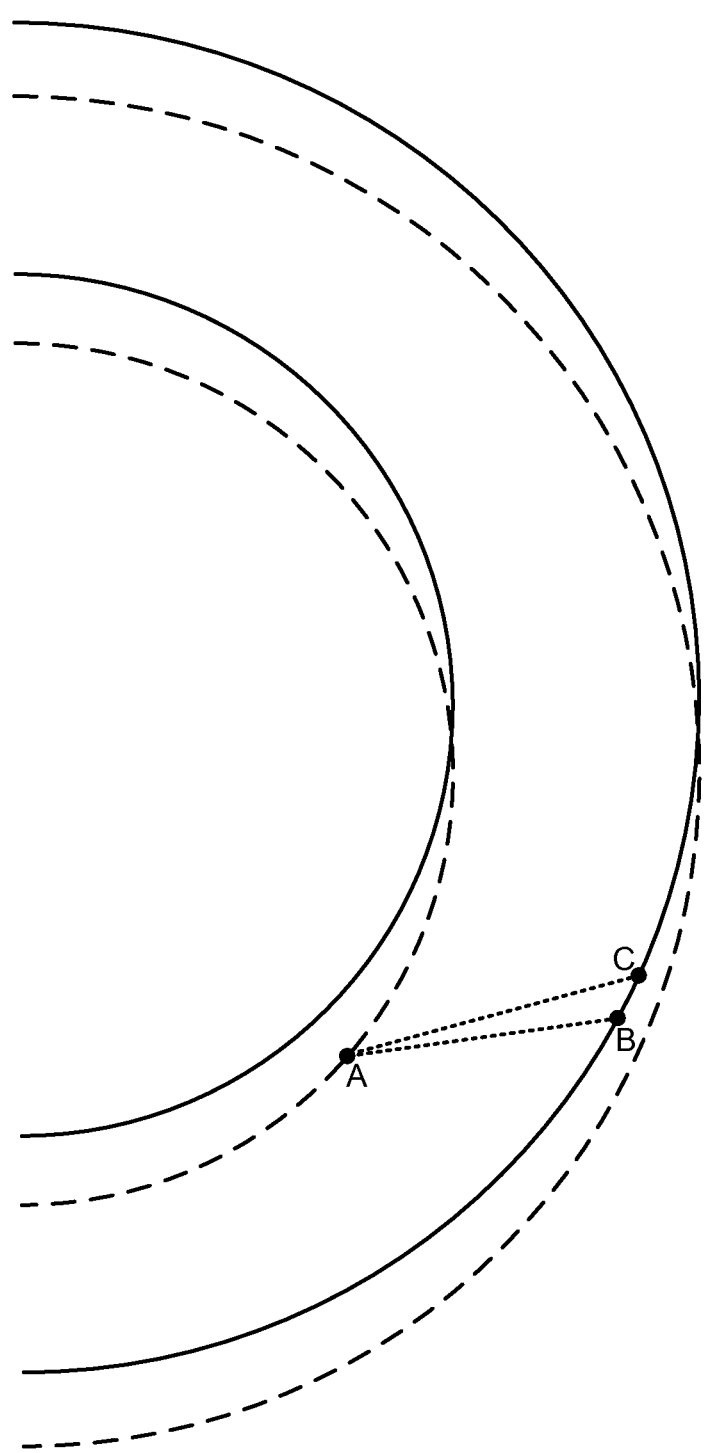

FIGS. 4D and 4E illustrates how the seek latency may be affected by when the head switch operation is performed due to the movement of the disk surfaces relative to the head (due to the RROs). Since the seek operation moves the head across the radius of the disk surface at a constant velocity relative to the disk surface (ignoring acceleration and deceleration), the seek velocity to a target track of a second disk surface may be different depending on the movement of the disk surfaces relative to the head. For example, if the second disk surface is moving toward the head (due to RRO), the seek velocity will be faster if the seek operation is performed on the first disk surface and the head switch performed at the end of the seek operation. Conversely, if the second disk surface is moving away from the head (due to RRO), the seek velocity will be faster if the head switch occurs at the beginning of the seek and the seek operation performed on the second disk surface.

FIG. 4D shows starting and ending tracks of a seek operation for a first disk surface (solid lines) and a second disk surface (dashed lines). In the example of FIG. 4D, a seek is performed from the first disk surface (inner solid line) to the second disk surface (outer dashed line). If the head switch is performed at the beginning of the seek operation and the seek performed on the second disk surface from point A to B, the seek velocity will be slower (and seek latency longer) as compared to seeking on the first disk surface from point A to C, performing the head switch, and then seeking on the second disk surface from C to D. This is because the second disk surface is moving toward the head due to the RRO in this example.

FIG. 4E shows starting and ending tracks of a seek operation for a first disk surface (dashed lines) and a second disk surface (solid lines). In the example of FIG. 4D, a seek is performed from the first disk surface (inner dashed line) to the second disk surface (outer solid line). In this example, the seek velocity is faster if the head switch occurs at the beginning of the seek operation and then seek on the second disk surface from point A to B. If the seek is performed on the first disk surface and the head switch performed at the end of the seek, the seek takes longer and ends at point C.

The above described embodiments assume the servo sectors $18_0$-$18_N$ of each disk surface are aligned from surface to surface such that there is no skew of the servo sectors when performing a head switch. For example, the above embodiments assume the first servo sector $18_0$ of a first disk surface $16_0$ is aligned with the first servo sector $18_0$ of a second disk surface $16_2$. In an alternative embodiment, there is a skew between the data sectors of first and second disk surfaces due, for example, to the disks being rotated relative to one another when clamped to the spindle motor, or due to a skew in recording the servo sectors on top and bottom surfaces of the same disk. FIG. 5A illustrates an example embodiment of this skew wherein a second disk surface $16_2$ is rotated by a phase offset Δ relative to a first disk surface $16_0$. The phase offset Δ may comprise a fraction of a servo wedge, an integer number of servo wedges, or an integer number plus a fraction of a servo wedge. In the example shown in FIG. 5A, the phase offset Δ comprises approximately one and a half servo wedges.

Figure 5B:
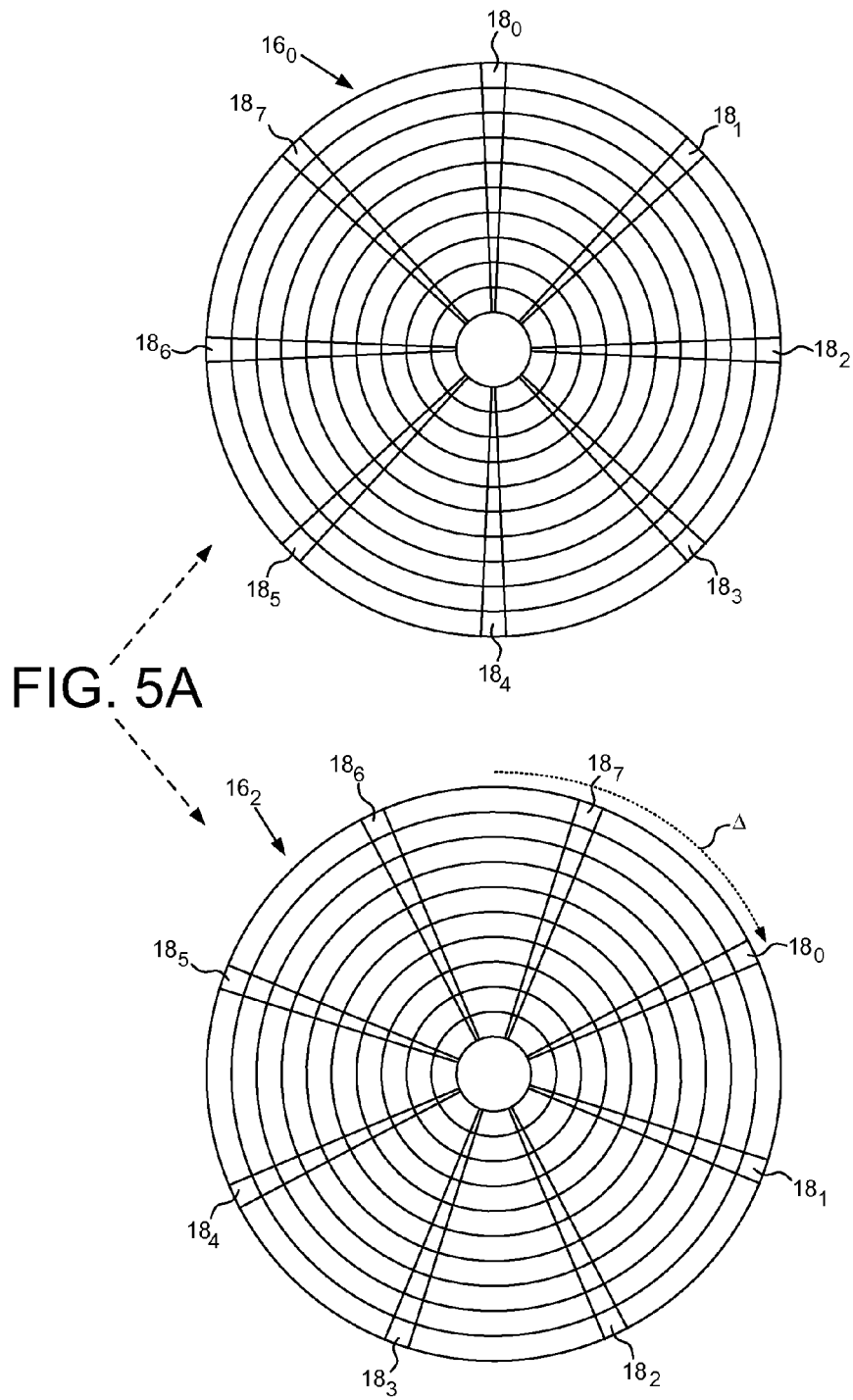
FIG. 5B shows an embodiment of the present invention wherein the skew of the servo sectors is accounted for when computing the difference between the RRO sinusoids.

In one embodiment, the starting point of the RRO sinusoids representing the RRO of each disk surface is generated relative to a reference servo sector (e.g., the first servo sector $18_0$) of each disk surface. In the embodiment where a skew of the servo sectors exists between the disk surfaces (FIG. 5A), there will be a corresponding phase offset Δ in the RRO sinusoids. In one embodiment, this phase offset Δ is accounted for by phase shifting at least one of the RRO sinusoids by the phase offset Δ, such as phase shifting at least one of the RRO sinusoids shown in the embodiments of FIGS. 4B and 4C. For example, the equation shown in FIG. 4B may be adjusted to include the phase offset(s) as shown in the equation of FIG. 5B, where $Δ_1$ and $Δ_2$ represent a skew between the servo sectors of the first and second disk surfaces.

In one embodiment, all of the RRO sinusoids are shifted by a phase offset relative to a reference disk surface prior to computing the adjustment d to the estimated seek distance described above. For example, the first disk surface $16_0$ may be considered the reference surface where the phase offset Δ is always zero for this surface. The phase offset Δ for the other disk surfaces $16_1$-$16_3$ are determined relative to the first disk surface $16_0$, that is, the starting point of each RRO sinusoid of the other disk surfaces $16_1$-$16_3$ are phase shifted so they align with the starting point of the RRO sinusoid of the first disk surface $16_0$. The adjustment d to the estimated seek distance is then computed as described above and used to estimate the seek latency for the RPO algorithm.

The phase offset Δ for each disk surface relative to the reference disk surface may be determined in any suitable manner. In one embodiment, the phase offset Δ for each disk surface is determined by timing the circumferential distance between the first servo sector $18_0$ of each disk surface. For example, while reading from the reference disk surface and when the first servo sector $18_0$ is detected, the head may be switched to a selected disk surface. The phase offset Δ for the selected disk surface is then determined relative to when the first servo sector $18_0$ for that disk surface is detected.

In one embodiment, the RRO sinusoids for computing the adjustment d to the estimated seek distance may be tuned to improve accuracy. For example, in one embodiment the error between the estimated adjustment d and the actual adjustment determined after a head switch during a seek may be used to adapt the coefficients of the RRO sinusoids in a direction that reduces the error. In one embodiment, the RRO of each disk surface may vary over time due, for example, to a change in environmental conditions (e.g., temperature), or due to the disks slipping relative to the spindle motor. Accordingly, in one embodiment the RRO sinusoids may be continuously tuned to compensate for changes to the RRO of each disk surface.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a first disk surface comprising a plurality of tracks, wherein each track comprises a number of data sectors and a number of servo sectors;
   a second disk surface comprising a plurality of tracks, wherein each track comprises a number of data sectors and a number of servo sectors;
   a head actuated over each disk surface; and
   control circuitry operable to:
      generate a first repeatable runout (RRO) sinusoid representing an RRO of the first disk surface;
      generate a second RRO sinusoid representing an RRO of the second disk surface;
      receive a plurality of access commands from a host;
      store the access commands in a command queue; and
      select one of the access commands to execute in response to the first and second RRO sinusoids.

2. The disk drive as recited in claim 1, wherein the control circuitry is further operable to:
   compute a difference between the first and second RRO sinusoids; and
   select one of the access commands to execute in response to the difference.

3. The disk drive as recited in claim 1, wherein the control circuitry is further operable to:
   generate the first RRO sinusoid according to:

$a1 \cos(2\pi k/N) + b1 \sin(2\pi k/N)$;

generate the second RRO sinusoid according to:

$a2 \cos(2\pi k/N) + b2 \sin(2\pi k/N)$;

where:
   a1, b1, a2, b2 are coefficients;
   k represents a servo sector index; and
   N is the number of servo sectors.

4. The disk drive as recited in claim 3, wherein the control circuitry is further operable to compute a difference between the first and second RRO sinusoids according to:

$[a1 \cos(2\pi i/N) + b1 \sin(2\pi i/N)] - [a2 \cos(2\pi i/N) + b2 \sin(2\pi i/N)]$ where i represents a starting servo sector of a seek operation.

5. The disk drive as recited in claim 3, wherein the control circuitry is further operable to compute a difference between the first and second RRO sinusoids according to:

$[a1 \cos(2\pi j/N) + b1 \sin(2\pi j/N)] - [a2 \cos(2\pi j/N) + b2 \sin(2\pi j/N)]$ where j represents an ending servo sector of a seek operation.

6. The disk drive as recited in claim 4, wherein the control circuitry is further operable to compute a difference between the first and second RRO sinusoids according to:

$[a1 \cos(2\pi(i-\Delta_1)/N) + b1 \sin(2\pi(i-\Delta_1)/N)] - [a2 \cos(2\pi(i-\Delta_2)/N) + b2 \sin(2\pi(i-\Delta_2)/N)]$ where $\Delta_1$ and $\Delta_2$ represent a skew between the servo sectors of the first and second disk surfaces.

7. The disk drive as recited in claim 5, wherein the control circuitry is further operable to compute a difference between the first and second RRO sinusoids according to:

$[a1 \cos(2\pi(j-\Delta_1)/N) + b1 \sin(2\pi(j-\Delta_1)/N)] - [a2 \cos(2\pi(j-\Delta_2)/N) + b2 \sin(2\pi(j-\Delta_2)/N)]$ where $\Delta_1$ and $\Delta_2$ represent a skew between the servo sectors of the first and second disk surfaces.

8. The disk drive as recited in claim 1, wherein the control circuitry is further operable to select one of the access commands to execute in response to the first and second RRO sinusoids and a skew between the servo sectors of the first and second disk surfaces.

9. A method of operating a disk drive, the disk drive comprising a first disk surface comprising a plurality of tracks, wherein each track comprises a number of data sectors and a number of servo sectors, a second disk surface comprising a plurality of tracks, wherein each track comprises a number of data sectors and a number of servo sectors, and a head actuated over each disk surface, the method comprising:
   generating a first repeatable runout (RRO) sinusoid representing an RRO of the first disk surface;
   generating a second RRO sinusoid representing an RRO of the second disk surface;
   receiving a plurality of access commands from a host;
   storing the access commands in a command queue; and
   selecting one of the access commands to execute in response to the first and second RRO sinusoids.

10. The method as recited in claim 9, further comprising:
    computing a difference between the first and second RRO sinusoids; and
    selecting one of the access commands to execute in response to the difference.

11. The method as recited in claim 9, further comprising:
    generating the first RRO sinusoid according to:

$a1 \cos(2\pi k/N) + b1 \sin(2\pi k/N)$;

generating the second RRO sinusoid according to:

$a2 \cos(2\pi k/N) + b2 \sin(2\pi k/N)$;

where:
    a1, b1, a2, b2 are coefficients;
    k represents a servo sector index; and
    N is the number of servo sectors.

12. The method as recited in claim 11, further comprising computing a difference between the first and second RRO sinusoids according to:

$$[a1\cos(2\pi i/N)+b1\sin(2\pi i/N)]-[a2\cos(2\pi i/N)+b2\sin(2\pi i/N)]$$

where i represents a starting servo sector of a seek operation.

13. The method as recited in claim 11, further comprising computing a difference between the first and second RRO sinusoids according to:

$$[a1\cos(2\pi j/N)+b1\sin(2\pi j/N)]-[a2\cos(2\pi j/N)+b2\sin(2\pi j/N)]$$

where j represents an ending servo sector of a seek operation.

14. The method as recited in claim 12, further comprising computing a difference between the first and second RRO sinusoids according to:

$$[a1\cos(2\pi(i-\Delta_1)/N)+b1\sin(2\pi(i-\Delta_1)/N)]-[a2\cos(2\pi(i-\Delta_2)/N)+b2\sin(2\pi(i-\Delta_2)/N)]$$

where $\Delta_1$ and $\Delta_2$ represent a skew between the servo sectors of the first and second disk surfaces.

15. The method as recited in claim 13, further comprising computing a difference between the first and second RRO sinusoids according to:

$$[a1\cos(2\pi(j-\Delta_1)/N)+b1\sin(2\pi(j-\Delta_1)/N)]-[a2\cos(2\pi(j-\Delta_2)/N)+b2\sin(2\pi(j-\Delta_2)/N)]$$

where $\Delta_1$ and $\Delta_2$ represent a skew between the servo sectors of the first and second disk surfaces.

16. The method as recited in claim 9, further comprising selecting one of the access commands to execute in response to the first and second RRO sinusoids and a skew between the servo sectors of the first and second disk surfaces.

* * * * *